United States Patent [19]

Martin

[11] 3,902,315

[45] Sept. 2, 1975

[54] STARTING FUEL CONTROL SYSTEM FOR GAS TURBINE ENGINES

[75] Inventor: Anthony N. Martin, Simsbury, Conn.

[73] Assignee: United Aircraft Corporation, East Hartford, Conn.

[22] Filed: June 12, 1974

[21] Appl. No.: 478,806

[52] U.S. Cl. ........ 60/39.14; 60/39.28 R; 60/39.28 T
[51] Int. Cl. ............................ F02c 7/26; F02c 9/04
[58] Field of Search ..................... 60/39.14, 39.28 R

[56] References Cited
UNITED STATES PATENTS

| | | | |
|---|---|---|---|
| 2,697,908 | 12/1954 | Offner | 60/39.28 R |
| 2,963,861 | 12/1960 | Waterman | 60/39.28 R |
| 2,971,338 | 2/1961 | Bodemuller | 60/39.28 R |
| 3,520,133 | 7/1970 | Loft | 60/39.14 |
| 3,601,984 | 8/1971 | Davis | 60/39.14 |
| 3,606,754 | 9/1971 | White | 60/39.14 |

Primary Examiner—C. J. Husar
Assistant Examiner—L. J. Casaregola
Attorney, Agent, or Firm—Donald F. Bradley

[57] ABSTRACT

The fuel flow in a gas turbine engine which is started by an auxiliary compressed air supply or cartridge is initially scheduled as a function of engine speed at all ambient conditions, resulting in an initially grossly over-rich fuel-air mixture and burning downstream beyond the combustor. The temperature in the tailpipe is sensed, and control of the engine fuel flow is automatically switched from the starting control schedule to an acceleration and speed control schedule when either the tailpipe temperature is decreasing at a rate greater than a reference value, or when the tailpipe temperature increases to a preselected value selected as a function of compressor inlet pressure and engine speed. Engine tailpipe temperature is sensed by a thermocouple having its cold junction located at the engine compressor inlet so that the tailpipe measurement reflects only the heat added to the exhaust gas by combustion.

8 Claims, 3 Drawing Figures

STARTING FUEL CONTROL SYSTEM FOR GAS TURBINE ENGINES

CROSS-REFERENCE TO RELATED APPLICATION

This application assigned to the same assignee contains subject matter related to Application Ser. No. 478,805, filed concurrently herewith for "Engine Starting System Using a Differential Temperature Control".

BACKGROUND OF THE INVENTION

1. Field of the Invention

This invention relates to a control for a gas turbine engine which automatically switches the fuel flow from a starting schedule to an acceleration and speed schedule at the proper time. While the fuel control is specifically adapted for use with relatively unsophisticated gas turbine engines such as those used in remotely piloted vehicles or missiles, the teachings of this invention are applicable to any engine in which it is desired to regulate fuel flow to the engine during starting of the engine to a schedule different from that desired during other operating regimes, and to automatically switch out of the starting schedule as a function of engine operation.

2. Description of the Prior Art

The development of low cost and therefore relatively unsophisticated gas turbine engines for expendable operations such as remotely piloted vehicles (RPV's) has made the development of an equally inexpensive and simplified fuel control for the engine a more difficult undertaking due to the less efficient combustor characteristics of the engine. This factor particularly increases the problem of starting the engine by conventional means, namely by accurately scheduling exact amounts of fuel to be supplied to the engine as a function of engine speed and compressor discharge pressure and also dependent on ambient conditions of temperature and pressure which vary with flight altitude and Mach number. Such a conventional starting schedule results in significantly less fuel being supplied to the engine during a start at high altitude than at sea level so as to prevent the engine from overheating due to the reduced air mass flowing through the engine causing an increased fuel-to-air ratio.

Another difficulty observed in low cost engines with a simple combustor is that the individual engines do not behave in an identical manner, thus further complicating the scheduling of fuel during the starting procedure.

It has been found that it is possible to start these engines regardless of deviations in performance between engines and at all desired ambient conditions by scheduling an essentially fixed quantity of fuel flow at the commencement of engine start. If the amount of fuel flow supplied during the starting procedure is scheduled to be equal to or in excess of that required for starting at sea level, then for a start at altitude the fuel-air mixture will be overrich and the mixture will burn downstream of the combustor proper, even beyond the turbine or outside the engine exhaust nozzle. If the fuel flow during starting is subsequently scheduled so that the fuel flow decreases as the engine speed increases, the flame will be progressively drawn back into the combustor as engine speed increases, and eventually the burning will stabilize within the combustor in the conventional manner to provide proper operation of the gas turbine cycle and expansion of the hot gases through the turbine.

Once proper operation of the engine cycle has been achieved and the engine is operating above its minimum self-sustaining speed, control of fuel flow is required to be switched from the starting schedule to an acceleration and speed schedule.

The present invention is directed broadly to a fuel control system for a gas turbine engine which comprises a starting schedule and an acceleration and speed schedule, with control being switched automatically from the starting to the acceleration schedule when the engine has achieved a successful start.

Another feature of the present invention is a fuel control system for a gas turbine engine in which the temperature of the engine exhaust gas is sensed and control of fuel flow to the engine is switched from a starting schedule to an acceleration and speed schedule when the magnitude or rate of change of exhaust gas temperature exceeds a predetermined value.

A further feature of the present invention is a starting control for a gas turbine engine in which the fuel flow during starting of the engine is scheduled in an amount in excess of that normally required, the fuel flow being subsequently reduced as engine speed increases.

A still further feature of the present invention is a novel thermocouple arrangement for measuring engine tailpipe temperature in which the thermocouple cold junction is located at the engine compressor inlet to provide a measurement of the temperature increase between the inlet and the tailpipe.

SUMMARY OF THE INVENTION

Starting of the gas turbine engine is accomplished by a cartridge or a compressed air supply which drives the engine rotor. During the initial starting procedure fuel is fed to the engine combustion chamber in an amount in excess of that required to accomplish starting so that burning can be initiated by a pyrotechnic flare or similar means downstream of the combustion chamber. As the engine speed increases, fuel flow is gradually reduced and the burning is drawn back into the combustor. The engine exhaust gas temperature is measured, and when the exhaust gas temperature reaches a maximum value determined as a function of inlet pressure in the engine, or when the exhaust gas temperature decreases at a predetermined rate indicating that its maximum has been passed and the burning has been drawn back into the combustor, control of fuel flow is automatically switched from the starting schedule to an acceleration and speed schedule.

Engine tailpipe temperature is sensed by a thermocouple having its cold junction located at the engine compressor inlet so that the tailpipe measurement reflects only the heat added to the exhaust gas by combustion.

DESCRIPTION OF THE PREFERRED EMBODIMENT

Figure 1:
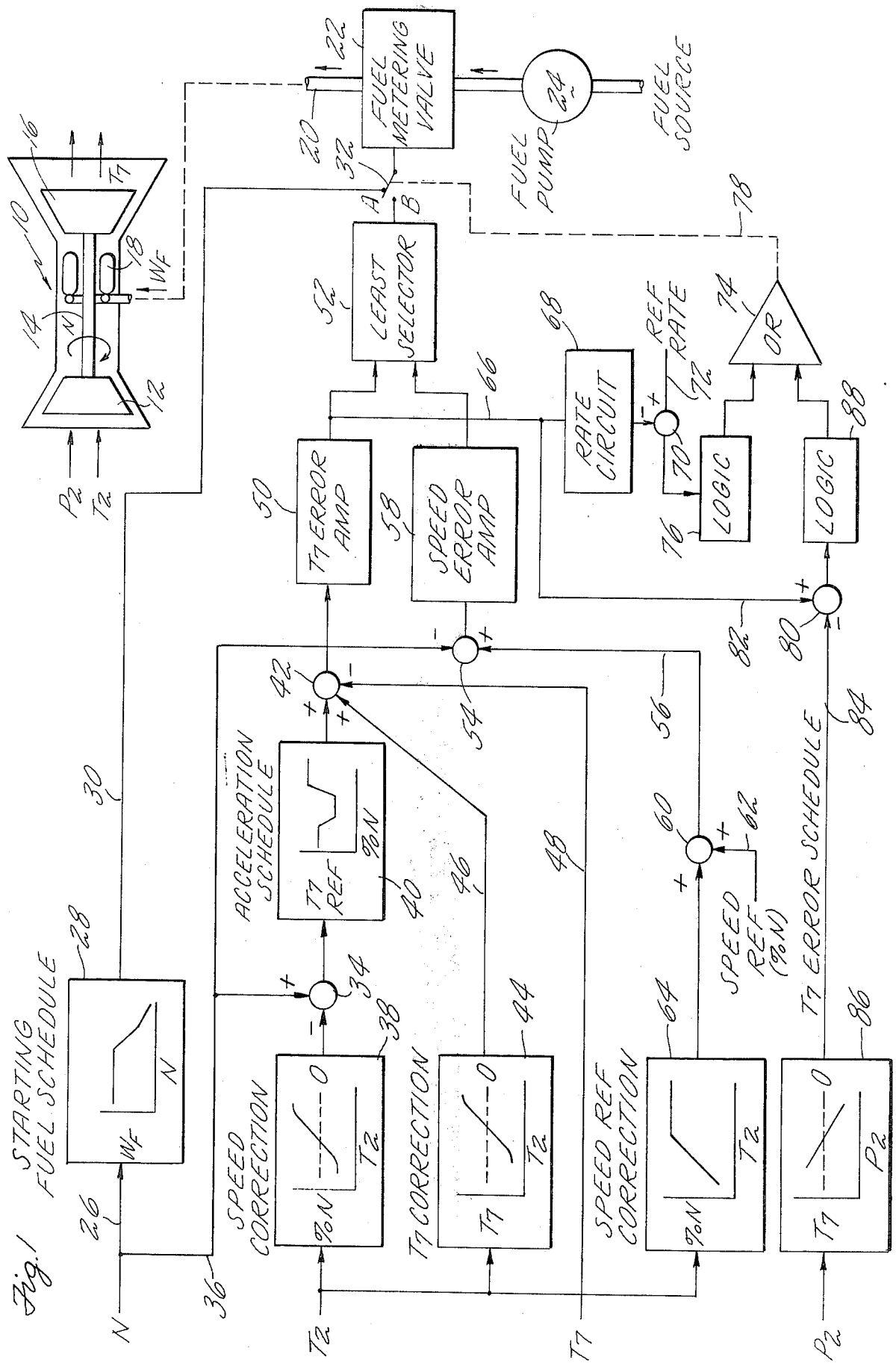
FIG. 1 is a schematic drawing partially in block diagram form showing the fuel control system of this invention in conjunction with a typical gas turbine engine.

Refering to FIG. 1 there is shown in schematic form a typical single spool axial flow gas turbine engine 10 of the type which is commonly used to power aircraft or remotely piloted vehicles. The engine 10 consists of a compressor 12 connected via shaft 14 to a turbine 16. Air is passed through the compressor 12 and then through one or more combustion chambers 18 where fuel is burned to add energy to the air. The heated air is then pased through turbine 16 which extracts sufficient energy to rotate the compressor 12, the remainder of the air being exhausted rearward through a nozzle to produce thrust.

In order to control the engine operation, the fuel flow $W_F$ to combustors 18 via line 20 is regulated by a fuel metering valve 22. The fuel is normally supplied from a pressurized tank, not shown, and passes through an engine driven centrifugal fuel pump 24. The fuel metering valve 22 is typically a proportional solenoid valve actuated by a drive amplifier in response to a fuel control signal to be described in detail.

Fuel controls for gas turbine engines typically measure selected engine operating conditions to determine engine performance and compare the measured values with desired or maximum values in order to schedule fuel flow. In the present invention the measured engine operating conditions are compressor inlet pressure $P_2$ which is a measure of Mach number, compressor inlet temperature $T_2$ which is a measure of altitude, engine speed N, and exhaust gas temperature (EGT) shown as $T_7$. Other related parameters may be sensed as is well known to those in the fuel control art. The sensors required for measuring the engine parameters and for producing signals indicative thereof are also well known and will not be described in detail. The compensation of the $T_7$ measurement using a thermocouple with its cold junction at $T_2$ will be described in detail subsequently.

Since the present invention is specifically adapted for a low cost gas turbine engine as is installed in remotely piloted vehicles, starting of the engine is typically accomplished by the use of an outside source of gas under pressure such as from a cartridge or a supply of compressed air, this type of apparatus being well known and forming no part of the present invention. The pressurized gas is fed into the engine to initiate rotation of the compressor 12 and turbine 16. At the same time fuel is fed into the combustion chambers 18 and ignition is accomplished by standard techniques.

In order to schedule the fuel flow $W_F$ during the starting procedure, a signal indicative of measured engine speed N is fed via line 26 to a function generator 28 which is typically an electronic circuit in which a commanded fuel flow signal $W_F$ is produced as a function of engine speed N. The fuel flow signal $W_F$ from block 28 is fed via line 30 and switch 32 to fuel metering valve 22 where the fuel flow to the engine is regulated in response thereto. Switch 32 is initially connected to contact A and will pass the signal from line 30 during the starting procedure.

As shown in block 28, the fuel flow signal $W_F$ is scheduled so that the fuel flow decreases as engine speed N increases. If, as contemplated by the present invention, the initial fuel flow is scheduled in an amount sufficient to supply the required flow to start the engine at sea level, and also to take into account engine-to-engine variations in combustor performance, there will be an excess of fuel if starting occurs at altitude or with a more efficient combustor. In the event that the remotely piloted vehicle engine is required to start at high altitudes, the excess fuel will cause an overrich fuel-air mixture at starting speeds, and as a result the majority of the fuel is burned beyond the turbine and sometimes beyond the exhaust nozzle itself. As the engine speed increases the airflow also increases thus weakening the fuel-air mixture, and the mixture will burn closer to the engine combustor section, being apparently drawn back into the engine. This effect is accentuated by the decreasing fuel flow scheduled by block 28. Eventually the flame will be drawn back into the combustor section, and continued reduction of fuel-air mixture by decreasing fuel flow or increasing airflow will cause the mixture to become too weak and the flame to be extinguished. This sequence of events causes an initially low value of exhaust gas temperature $T_7$ which increases to a peak as the flame is drawn back into the combustor, subsequently decreasing with the weakening mixture.

To utilize this characteristic, exhaust gas temperature $T_7$ is measured, and the starting fuel schedule is disconnected and replaced by an acceleration and speed governing schedule which is connected to the fuel metering valve in response a signal that the flame has been drawn back into the combustor section. The disconnection of the starting fuel schedule and the connection of the acceleration and speed schedule is effected by disconnecting switch 32 from contact A and connecting it to contact B.

The acceleration schedule regulates exhaust gas temperature $T_7$ as a function of speed N. The speed signal N modified to reflect a percentage of maximum speed is fed to a junction 34 via line 36. Also fed to junction 34 is a speed correction signal generated in block 38 as a function of $T_2$ to reflect changes in total airflow with ambient conditions. The corrected speed signal %N at junction 34 is fed to a block 40 where $T_7$ is scheduled to obtain an exhaust gas temperature limit signal during the critical acceleration phase and to prevent surge in the engine. The scheduled $T_7$ limit signal from block 40 is fed to a junction 42 where it is further corrected for ambient temperature variations by a $T_7$ correction signal generated in block 44 as a function of $T_2$ and fed to junction 42 via line 46. The corrected $T_7$ limit signal in junction 42 is then compared with the measured $T_7$ signal fed to junction 42 via line 48. The resultant output from junction 42 is a temperature error signal which is dynamically compensated and amplified in block 50 and fed to a least selector 52.

The measured speed signal %N on line 36 is also fed to a junction 54 where it is compared with a desired speed signal from line 56 to produce a speed error signal which is fed through a speed amplifier 58 and then to least selector 52. Speed amplifier 58 also provides the necessary dynamic compensation. The desired speed signal on line 56 is produced at junction 60 by a speed reference signal %N on line 62 as corrected by the output signal from block 64. The speed reference signal on line 62 is produced by a command such as a pilot actuated power lever signal in a manned aircraft, or from some other command source in a remotely piloted vehicle. The correction to the reference signal supplied by block 64 is a function of $T_2$. As $T_2$ increases, engine thrust decreases for a given speed, and the correction signal permits maintenance of a constant thrust under varying inlet temperature conditions.

The least selector 52 passes the signal, either the temperature error signal from amplifier 50 or the speed error signal from amplifier 58, which calls for the least fuel flow. The output from least selector 52 is fed to terminal B of switch 32.

Figure 2:
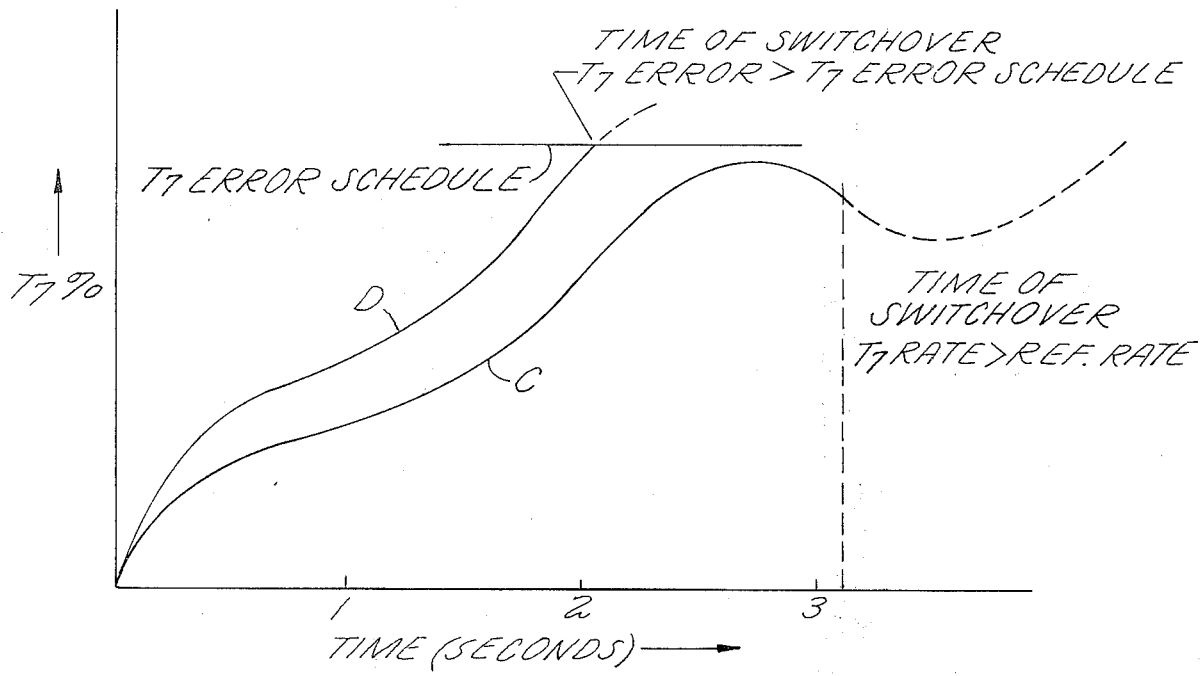
FIG. 2 is a graph showing the change in exhaust gas temperature with time during the starting of a typical gas turbine engine using the concepts of the present invention.

In order to determine when switch 32 should be moved from terminal A to terminal B and thus switch control from the starting schedule to the acceleration and speed schedule, the $T_7$ error signal produced in amplifier 50 is fed via line 66 to a rate circuit 68 where a signal indicative of the rate of change of $T_7$ with time is produced, i.e., the first derivative of $T_7$. It can be seen by reference to the curve in block 40 that the $T_7$ reference signal is constant at low speeds, and hence the first derivative of $T_7$ is the same as the first derivative of the $T_7$ error at low speeds. FIG. 2 shows at curve C the typical change in $T_7$ with time during starting of the engine. The exhaust gas temperature $T_7$ increases rapidly during the first several seconds and then begins to decrease as the flame is drawn back into the combustor. $T_7$ will also reduce because as speed N increases, fuel flow is reduced as shown by starting schedule block 28. As $T_7$ begins to decrease, the sign of the derivative changes. The output from rate circuit 68 is fed to a junction 70 where it is compared with a reference rate signal on line 72. The reference rate signal is selected so that when $T_7$ decreases at a rate greater than that set by the reference signal, about 350°F per second, a signal is fed to logic circuit 76. When logic block 76 senses that its input signal has become negative, indicating that $T_7$ is decreasing at a rate greater than the reference rate, a 1 is fed to OR circuit 74 causing OR circuit 74 to produce an output signal which is fed to switch 32 via line 78 to cause the switch to move from terminal A to terminal B. The starting schedule is thus disconnected and the acceleration and speed schedule controls the fuel flow through valve 22.

In the event that a particular engine has a more efficient burner than the average, the tailpipe temperature will be higher and the present system will then also disconnect the open loop starting schedule and connect the closed loop acceleration and speed schedule to fuel metering valve 22 when the measured $T_7$ temperature error reaches a value set by schedule block 86 as a function of compressor inlet pressure $P_2$. The temperature error signal on line 66 is fed as one input to junction 80 via line 82. Also fed to junction 80 via line 84 is a $T_7$ reference signal scheduled by $P_2$ in block 86. As $P_2$ decreases thus indicating decreasing airflow it is necessary to increase the $T_7$ reference. Since the $T_7$ schedule in block 40 does not change at low speeds, junction 80 in effect directly varies with actual $T_7$, and when it approaches its limit as determined by the schedule of block 86, a signal is fed to logic block 88 which feeds a 1 to OR circuit 74 when the input to logic block 88 is negative, thus causing actuation of the OR circuit 74 and movement of switch 32 from terminal A to terminal B. Curve D of FIG. 2 shows the change in $T_7$ versus time and the switchover point for engines with highly efficient burners.

During the time immediately after the control has switched from the starting schedule to the acceleration and speed schedule, the least error signal will normally be the temperature error signal fed to amplifier 50, and this signal will control fuel flow until actual engine speed approaches the commanded engine speed. This is due to the starting system ensuring that the engine operation is already close to the $T_7$ limit prior to switchover to the acceleration schedule. Acceleration will thus normally be controlled as a function of the limiting temperature until the speed error signal becomes small.

Figure 3:
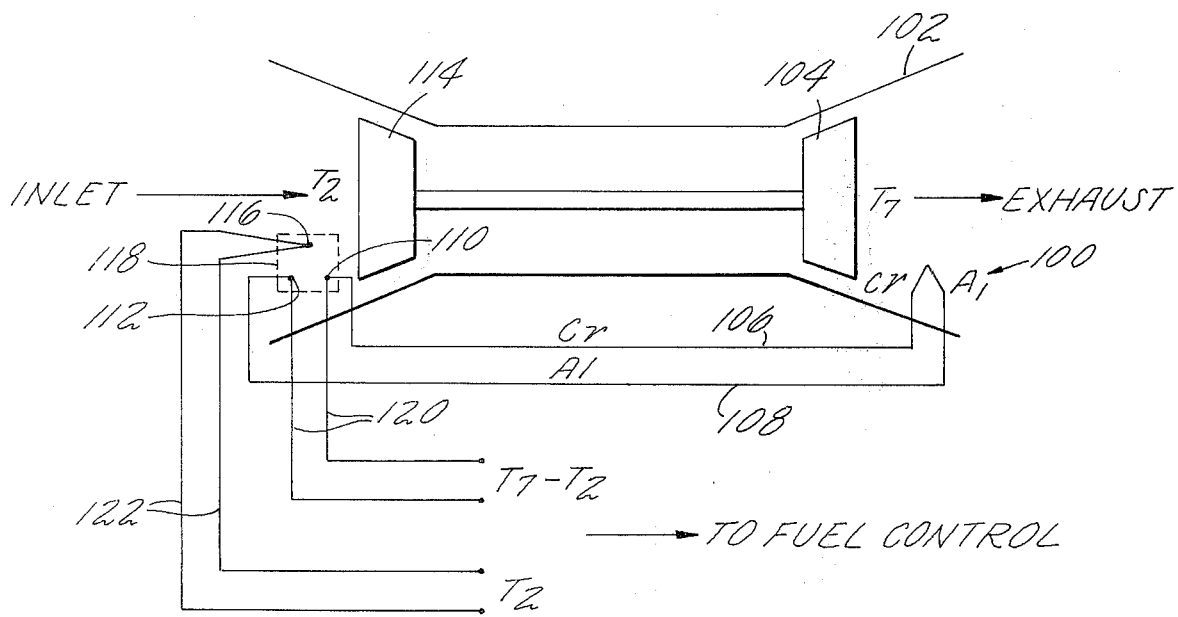
FIG. 3 is a schematic illustration of a turbine engine in which a thermocouple used for measuring tailpipe temperature is implemented as a differential measurement with inlet temperature, the inlet temperature being measured by another sensor to provide compensation for ambient temperature conditions for control purposes.

An additional feature of the present invention is the novel arrangement of the thermocouple in the control of tailpipe temperature $T_7$. As shown in FIG. 3, the cold junction of the thermocouple used for measuring exhaust gas temperature $T_7$ is located at the compressor inlet $T_2$. In this way the output of the thermocouple is a signal measuring $T_7-T_2$, this being the temperature rise of the air passing through the engine. For control purposes this signal is used to perform the logic and schedule functions together with other sensed parameters, including inlet temperature $T_2$. Thus in the present control, wherever $T_7$ is measured the measurement is actually $T_7-T_2$.

Referring specifically to the Figure, there is shown a thermocouple 100 inserted in the tailpipe 102 of a gas turbine engine in the path of the exhaust gas which passes through the turbine 104. Thermocouple 100 is of standard construction, typically of chromel-alumel, and is physically connected in the engine tailpipe by known techniques.

In the prior art the two leads from the thermocouple used to sense exhaust gas temperature were connected directly to the control or electronics modules where the voltage signal from the thermocouple was compensated for ambient temperature at its junctions by another temperature sensor. In practice the chromel and alumel metals of the thermocouple junction had to be used to carry the thermocouple voltage signal to the control module. Where the leads passed through the wall of the control module it was necessary to replace the regular connector pins with alumel or chromel types. Once inside the control module, copper wires were connected to the chromel and alumel leads and a thermistor was typically located adjacent to these lead junctions. The thermistor output was connected as a bias input to a differential amplifier to which the copper wires from the thermocouple leads were also connected. The output of the differential amplifier thus indicated the temperature measured by the thermocouple as compensated by the cold junction temperature measured by the thermistor at a location remote from the thermocouple.

In the present system shown in FIG. 3, the leads from the chromel-alumel thermocouple 100 are fed through a chromel wire 106 connected to the chromel lead of the thermocouple, and through an alumel wire 108 connected to the alumel lead of the thermocouple, the two wires 106 and 108 terminating at junctions 110 and 112 respectively located at the inlet of engine compressor 114. Also located at the compressor inlet is a thermistor illustrated at 116. The junctions 110 and 112 and the thermistor 116 are typically potted in a plastic or similar support shown schematically at 118. Leads 120 which may be copper wires are connected at one end to junctions 110 and 112, the leads 120 being fed to the control module which in the present example is a fuel control. This signal appearing on leads 120 is equivalent to the difference between engine exhaust gas temperature $T_7$ and the engine compressor inlet temperature $T_2$, i.e., the heat added to the engine airflow during the turbine cycle. Near engine start such heat rise is approximately that due to the combustion process. Leads 122 emanating from thermistor 116 reflect the compressor inlet temperature $T_2$.

Although the invention has been described with reference to its preferred embodiment, it is apparent that changes may be made to its construction and implementation without departing from the scope of the invention as hereinafter claimed.

I claim:

1. In a fuel control for an airbreathing engine having a combustor to which an excessive amount of fuel is initially supplied during starting thereof, said excessive fuel resulting in an overrich fuel-air mixture and causing burning of said fuel downstream from said combustor, a first control means responsive to engine speed for scheduling fuel flow to said engine inversely with engine speed during starting thereof, a second control means responsive to selected engine operating conditions for scheduling fuel flow to said engine when said engine has reached a self-sustaining speed, and means responsive to the temperature of said engine at a selected point downstream from said combustor for switching control of said fuel flow from said first means to said second means.

2. A fuel control as in claim 1 in which said temperature responsive means comprises means for producing a signal indicative of the actual temperature in the engine exhaust gases downstream from said combustor, means responsive to engine speed and to ambient air temperature for producing an engine exhaust gas temperature reference signal, means for comparing said reference signal with said actual temperature signal to produce an exhaust gas temperature error signal, and means for switching control of said fuel flow when said error signal decreases at a rate greater than a preselected magnitude.

3. A fuel control as in claim 1 in which said temperature responsive means includes means for producing a signal indicative of the actual temperature in the engine exhaust gases downstream from said combustor, means responsive to engine speed and to ambient air temperature for producing an engine exhaust gas temperature reference signal, means for comparing said reference signal with said actual temperature signal to produce an exhaust gas temperature error signal, means responsive to the ambient air conditions for producing an exhaust gas temperature error limit signal, and means for switching control of said fuel flow when said exhaust gas temperature error signal is less than said exhaust gas temperature error limit signal.

4. Apparatus as in claim 1 and including a rate circuit, means for connecting said temperature error signal to said rate circuit to produce a derivative signal, a reference signal, means comparing said derivative signal with said reference signal to produce a logic signal when said derivative signal exceeds said reference signal, and switch means connected with said fuel metering valve responsive to said logic signal.

5. Apparatus as in claim 1 in which said means for producing said first control signal includes means for producing a signal indicative of engine speed, and means inversely responsive to said engine speed signal for producing said first control signal.

6. Apparatus as in claim 1 in which said airbreathing engine is a gas turbine engine, said exhaust gas temperature responsive means including a thermocouple connected in the tailpipe of said turbine engine.

7. In an airbreathing engine in which fuel is supplied to a combustor for combustion therein, a control for regulating the flow of fuel to said combustor comprising a conduit connecting a source of fuel with said combustor, a fuel metering valve connected in said conduit, means for producing a first control signal indicative of desired fuel flow during starting of said engine, means connecting said first control signal to said fuel metering valve, means for producing a second control signal indicative of desired fuel flow when said engine has reached a self-sustaining speed, means for scheduling in response to selected engine parameters an engine exhaust gas temperature reference signal, means for producing a signal indicative of the actual engine exhaust gas temperature, means for comparing said exhaust gas temperature reference signal with said actual exhaust gas temperature signal and producing therefrom an exhaust gas temperature error signal, and means responsive to a decrease in said temperature error signal at a rate greater than a preselected magnitude for disconnecting said first control signal from said fuel metering valve and connecting thereto said second control signal.

8. In an airbreathing engine in which fuel is supplied to a combustor for combustion therein, a control for regulating the flow of fuel to said combustor comprising a conduit connecting a source of fuel with said combustor, a fuel metering valve connected in said conduit, means for producing a first control signal indicative of desired fuel flow during starting of said engine, means connecting said first control signal to said fuel metering valve, means for producing a second control signal indicative of desired fuel flow when said engine has reached a self-sustaining speed, means for scheduling in response to selected engine parameters an engine exhaust gas temperature reference signal, means for producing a signal indicative of the actual engine exhaust gas temperature, means for comparing said exhaust gas temperature reference signal with said actual exhaust gas temperature signal and producing therefrom an exhaust gas temperature error signal, means for scheduling in response to ambient pressure an exhaust gas temperature error limit signal, and means for disconnecting said first control signal from said fuel metering valve and connecting thereto said second control signal when said exhaust gas temperature error signal is less than said exhaust gas temperature error limit signal.

* * * * *